(12) United States Patent
Linden et al.

(10) Patent No.: US 7,555,401 B2
(45) Date of Patent: Jun. 30, 2009

(54) SENSORLESS MEASUREMENT OF POSITIONING TRAVEL, ESPECIALLY ON AN ELECTROMOTIVELY OPERATED PARKING BRAKE

(75) Inventors: Christoph Linden, Vallendar (DE); Michael Keller, Traisen (DE)

(73) Assignee: Lucas Automotive GmbH (DE)

( * ) Notice: Subject to any disclaimer, the term of this patent is extended or adjusted under 35 U.S.C. 154(b) by 16 days.

(21) Appl. No.: 11/794,029

(22) PCT Filed: Dec. 15, 2005

(86) PCT No.: PCT/EP2005/013486

§ 371 (c)(1),
(2), (4) Date: Jun. 21, 2007

(87) PCT Pub. No.: WO2006/069635

PCT Pub. Date: Jul. 6, 2006

(65) Prior Publication Data

US 2008/0004832 A1    Jan. 3, 2008

(30) Foreign Application Priority Data

Dec. 22, 2004    (DE)    ........................ 10 2004 061 917

(51) Int. Cl.
*G06F 15/00*    (2006.01)
(52) U.S. Cl. ........................................ 702/145; 702/158
(58) Field of Classification Search ................. 324/143; 702/145, 155, 158
See application file for complete search history.

(56) References Cited

U.S. PATENT DOCUMENTS

| | | | |
|---|---|---|---|
| 5,442,273 | A | 8/1995 | Ikawa et al. |
| 5,783,917 | A | 7/1998 | Takekawa |
| 5,877,955 | A * | 3/1999 | Struyk ........................ 700/69 |
| 6,144,179 | A | 11/2000 | Kessler et al. |
| 6,273,492 | B1 | 8/2001 | Schröder et al. |
| 6,859,030 | B2 | 2/2005 | Otte |

FOREIGN PATENT DOCUMENTS

| | | |
|---|---|---|
| DE | 44 10 062 C2 | 9/1994 |
| DE | 197 29 238 C1 | 8/1998 |
| DE | 198 42 337 A1 | 3/2000 |
| DE | 100 28 035 A1 | 12/2001 |
| JP | 2003 209989 A | 7/2003 |

* cited by examiner

*Primary Examiner*—Edward R Cosimano
*Assistant Examiner*—Douglas N Washburn
(74) *Attorney, Agent, or Firm*—MacMillan, Sobanski & Todd, LLC

(57) ABSTRACT

The invention relates to a method for establishing the position of an actuating unit which is operated by an electric motor, in which a motor speed is determined from a motor model, the speed is integrated over a period of time and the position of the actuating unit is determined by multiplying the result of the integration by a proportionality factor. The motor model takes account of afterrunning of the electric motor at the instant of switch-off. The invention also relates to actuating units, brakes, pumps and transmissions for which the method can be used.

18 Claims, 9 Drawing Sheets

SENSORLESS MEASUREMENT OF POSITIONING TRAVEL, ESPECIALLY ON AN ELECTROMOTIVELY OPERATED PARKING BRAKE

CROSS-REFERENCE TO RELATED APPLICATIONS

This application is a National Stage of International Application No. PCT/EP2005/013486 filed Dec. 15, 2005, the disclosures of which are incorporated herein by reference, and which claimed priority to German Patent Application No. 10 2004 061 917.4 filed Dec. 22, 2004, the disclosures of which are incorporated herein by reference.

BACKGROUND OF THE INVENTION

The invention relates to a method for establishing the position of an actuating unit which is operated by an electric motor. The invention also relates to brakes, pumps and transmissions in which actuating units of this kind are used.

In the case of, for example, an electronic parking brake (EPB) which is operated by an actuating unit the motor speed is as a rule currently measured by sensor technology (for instance by means of a Hall sensor). The number of detected revolutions (or of pulses delivered by the Hall sensor) multiplied by a motor constant gives the travel completed by the actuating unit. However high costs are incurred by fitting a Hall or another sensor.

Approaches for establishing a motor speed without a sensor, e.g. from the number of commutation changes, are already known. However these have the disadvantage of being susceptible to faults. The patent DE 197 29 238 C1, and corresponding U.S. Pat. No. 6,144,179, both of which are incorporated by reference herein, describes, for example, a method for establishing the speed of mechanically commutated D.C. motors in which the speed is established from a motor state model in parallel with the detection of the waviness (current ripple) of the motor current. The speed is firstly established from the motor state model, which is based on the electromechanical motor equations, after which a reliable set time range is predetermined for the following commutating process. If no waviness is detected within this set time range on account of a fault, the probable speed and the probable commutating instant derived from the latter are assumed.

The object of the present invention is to precisely establish the travel of an actuating unit without using additional sensor technology. A further object of the present invention is to enable the travel of the actuating unit to be quickly determined continuously or at short time intervals.

BRIEF SUMMARY OF THE INVENTION

The above-mentioned objects are achieved by a method according to the invention for establishing a position of an actuating unit which is operated by an electric motor, comprising the steps of determining a motor speed from a motor model, integrating the motor speed over a period of time and determining the position of the actuating unit by multiplying the result of the integration by a proportionality factor, wherein the motor model takes account of afterrunning of the electric motor. By means of integration the travel which is completed by the actuating unit can be calculated from the motor speed, which is multiplied by a proportionality factor.

One concept of the method presented in the invention is a distance model to which measured operating data with which a motor speed is calculated from a motor model are preferably in any case delivered. Measured operating data are the operating voltage $U_q$ applied to the motor terminals and the current $I_{mess}$ measured in the lines. Further operating data may also be delivered to the motor model.

In one embodiment the motor model takes account of a loading torque acting on the electric motor at the instant of switch-off. In one embodiment the motor model takes account of damping proportional to the speed in addition or alternatively to this.

In a further embodiment the speed-proportional damping is included in the motor model as a damping torque, wherein the damping torque, equal to a damping constant, is multiplied by an angular speed of the electric motor. In one development of the invention the damping constant is equal to a no-load friction torque divided by a no-load angular speed of the motor. However other approaches for establishing the speed-proportional damping are also conceivable.

In a further embodiment, which can be combined with the above embodiments, the motor model additionally takes account of a loading torque in that the torque is preferably determined from a measured motor current, with an efficiency factor of an electrical part of the electric motor being taken into account.

The method according to the invention can be carried out in accordance with (external or internal) trigger signals. Thus the method can additionally comprise the step of connecting a trigger signal as the first step, wherein the step of determining the motor speed is only executed when the trigger signal is connected.

The method according to the invention can also additionally comprise the step of disconnecting the trigger signal as the last step, wherein the applied load torque is determined when the trigger signal is disconnected. The load torque can be delivered to the model (constantly or only at certain instants), e.g. as long as the speed calculated by the model is greater than zero and the applied load torque assumes the value zero when the calculated speed is zero.

According to one development, the induced voltage is delivered as the supply voltage to the model when the trigger signal is disconnected. In a further embodiment an integrator for calculating speed and travel is reset at the beginning of the calculation at each rising edge of the trigger signal.

The method according to the invention can additionally comprise the step of converting the speed into revolutions per second.

A computer program product according to the invention for establishing the position of an actuating unit operated by an electric motor comprises program codes for executing the steps of determining a motor speed from a motor model and determining the travel completed by the actuating unit by integrating the motor speed over a period of time and multiplying it by a proportionality factor, wherein the motor model takes account of afterrunning of the electric motor.

The method according to the invention can generally be used in an actuating unit and specifically, for example, in an electromechanical brake (EMB), an electric parking brake (EPB), a hydraulic parking brake (HPB), a pump unit of an anti-lock braking system (ABS) and a transmission.

An actuating device according to the invention comprises an electric motor and an actuating unit, which is operated by the electric motor, with a memory unit for a motor model and with a processor, wherein, in order to establish the position of the actuating unit operated by an electric motor, the memory unit comprises program codes for executing the steps of determining a motor speed from a motor model and determining a travel completed by the actuating unit by integrating the motor speed over a period of time and multiplying it by a proportionality factor, and wherein the motor model takes account of afterrunning of the electric motor.

A brake according to the invention comprises an actuating device according to the invention as described above, wherein the actuating device actuates the brake.

A pump device according to the invention comprises an actuating device according to the invention as described above, wherein the actuating device actuates the pump device.

A transmission according to the invention comprises an actuating device according to the invention as described above, wherein the actuating device actuates the transmission.

Other advantages of this invention will become apparent to those skilled in the art from the following detailed description of the preferred embodiments, when read in light of the accompanying drawings.

DETAILED DESCRIPTION OF THE INVENTION

Figure 1:
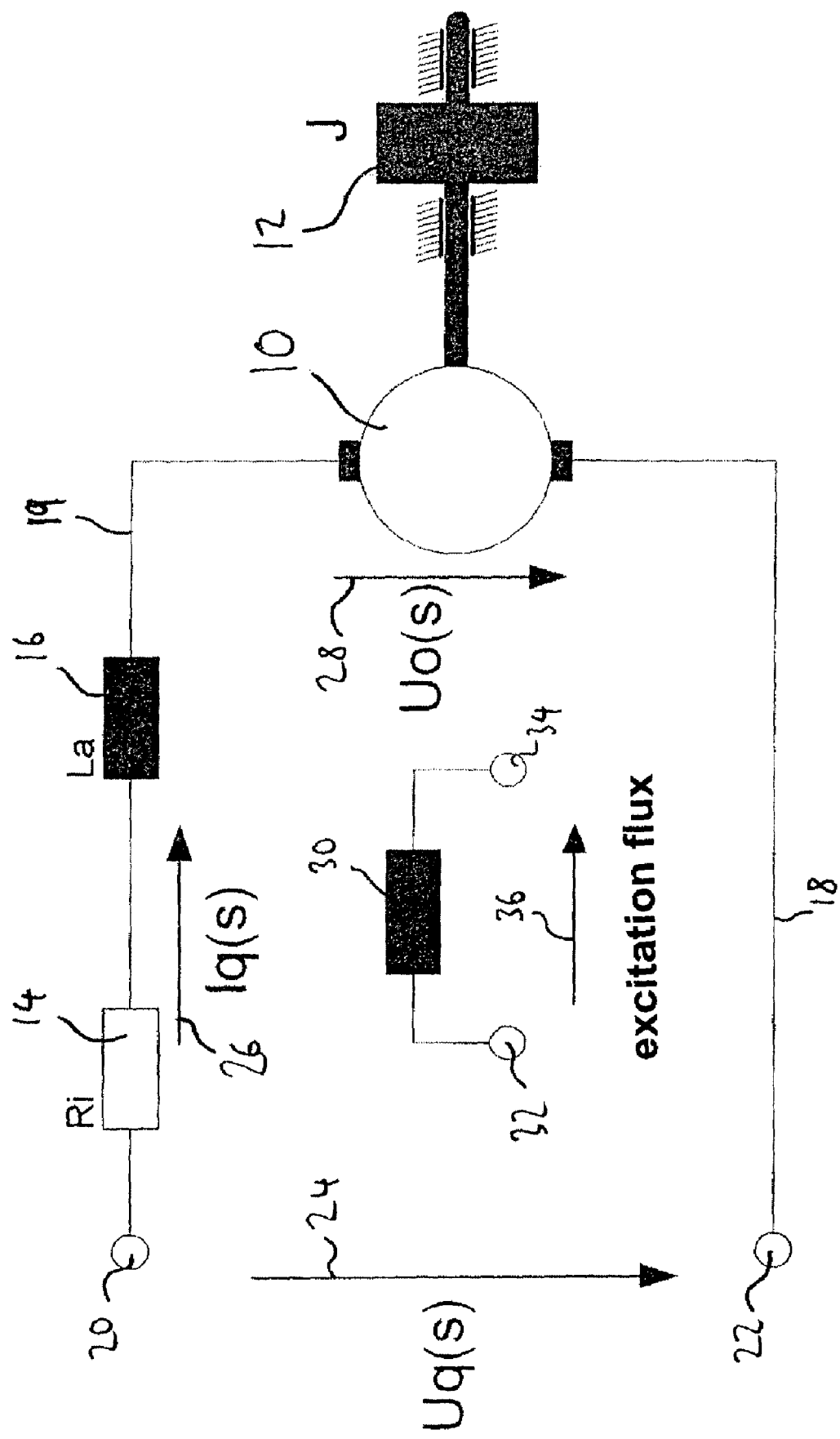
FIG. 1 shows an equivalent circuit diagram for a D.C. motor with a load connected to the D.C. motor.

In order to establish a motor model for a D.C. motor which is excited by a permanent magnet, the equivalent circuit diagram of the separately excited D.C. motor can generally be taken as a starting point.

The following variables are used in the following:

$U_q$ applied operating voltage (terminal voltage)

$U_o$ induced voltage in the motor on account of the rotational movement $R_i$ armature resistance $L_a$ armature coil inductance $I_q$ armature current $I_{mess}$ measured motor current $\psi_d$ magnetic flux $K_m$ motor constant (indicated by the manufacturer, unit: Nm/A)

s Laplace variable $\omega$ angular speed of the motor (angular frequency)

J moment of inertia of the load $M_{el}$ electrically generated driving torque $M_L$ load torque on the motor shaft $M_T$ acceleration torque $M_d$ damping torque c proportionality constant $T_a$ armature time constant $M_{fr\infty}$ no-load friction torque (unit: Nm)

$I_\infty$ no-load current (unit: A)

$\Omega_\infty$ no-load angular speed (unit: rad/s)

b damping constant (unit: Nm sec/rad $\eta$ efficiency factor

A voltage which is induced in an armature of an electric motor is generally calculated as:

$$U_0(s) = c \cdot \psi_d \cdot \omega(s) \quad \text{(equation 1.0)}$$

Here s is the Laplace variable by means of which the arising differential equations, as are usual in control engineering, are written. The proportionality constant c is designated the machine constant, which depends, inter alia, on the geometric dimensions of the motor windings.

From this follows, for the voltage cycle in an armature circuit of an electric motor:

$$U_q(s) = I_q(s) \cdot (R_i + s \cdot L_a) + U_0(s) \quad \text{(equation 1.1)}$$

The armature time constant $T_a$ is given by:

$$T_a = \frac{L_a}{R_i} \quad \text{(equation 1.2)}$$

The following is obtained by adapting equation 1.1 and using equation 1.2:

$$I_q(s) = \frac{(U_q(s) - U_0(s))}{R_i} \cdot \frac{1}{1 + s \cdot T_a} \quad \text{(equation 1.3)}$$

From the general motor constant $k_m$, given by $$k_m = c \cdot \psi_d \quad \text{(equation 1.4),}$$

which can be obtained from a motor data sheet also supplied by the motor manufacturer, the torque which can be electrically generated, $M_{el}$, can be calculated:

$$M_{el} = k_m \cdot I_q(s) \quad \text{(equation 1.5)}$$

The generated electrical driving torque $M_{el}$ is in equilibrium with the load torque $M_L$ and the torque $M_T$ which is necessary for the acceleration or deceleration of the inertias.

Using the Laplace transformation, the torque $M_T$ which is necessary for acceleration or deceleration is calculated as:

$$M_T(s)=J \cdot s \cdot \omega(s) \quad \text{(equation 1.6)}$$

Expressed as torque equilibrium:

$$M_T(s)=M_{el}(s)-M_L(s) \quad \text{(equation 1.7)}$$

The equations 1.1 to 1.7 represent the basic model for the d.c. motor. The motor model reproduces the system behaviour both dynamically and statically. The basic model is extended as follows in order to obtain a usable model for estimating travel.

The motor model of the d.c. motor is firstly extended by speed-proportional damping. The afterrunning or running-down behaviour of the motor upon being switched off can additionally be taken into account.

The friction torque $M_{f\infty}$ occurring at no-load speed is caused by bearings and brush friction as well as by mechanical and electrical losses in the air gap or iron of the rotor. The bearings and brush friction can be modelled as Coulomb friction, the losses in the air gap and in the iron as viscous friction. The friction torque is the sum of both components. It is obtained with the motor constant from the no-load current. In order to obtain a linear model, the entire friction is assumed to be proportional to the speed. The associated damping constant is calculated from the data sheet details of the motor manufacturer.

$$b = \frac{M_{f\infty}}{\Omega_\infty} = \frac{k_m \cdot I_\infty}{\Omega_\infty} \quad \text{(equation 1.8)}$$

As indicated, this damping is proportional to the speed. For the model this means that a further term must be taken into account in the torque equilibrium (equation 1.7). It follows that:

$$M_d(s)=b^*\omega(s) \quad \text{(equation 1.9)}$$

$$M_T(s)=M_{el}(s)-M_L(s)-M_d(s) \quad \text{(equation 1.10)}$$

According to one embodiment, the motor model is additionally extended such that the loading motor torque is taken into account. In this respect it is of no significance from what the load motor torque results. If, for example, the internal friction of the construction changes, the motor current changes in direct proportion to this. It is thus possible, by means of the motor current, to calculate the load torque from the motor constant (the motor constant is usually indicated by the motor manufacturer).

The measured motor current is proportional to the load. In this respect it is of no significance from what the load torque results. If, for example, the internal friction of the construction changes, the motor current changes in direct proportion to this. If the friction increases, the current increases. If the friction decreases, the current decreases. The same applies to a load change at the driving motor shaft. However the efficiency factor of the electrical part of the motor must be taken into account. The efficiency factor can be established by using measurement technology. With these interrelationships it is possible to calculate the load torque from the motor constant $k_m$ by means of the motor current.

In order to obtain a real motor model which is in running order, the terminal voltage $U_q$ and the current $I_{mess}$ should only be switched to the model when the motor is actually also activated in the application. Otherwise the real behaviour cannot be calculated error-free, especially when switching on takes place.

A trigger signal is provided in a further embodiment.

By switching on the motor with the trigger signal, the measured battery voltage and the current actually flowing are firstly switched to the model. As long as the trigger signal is zero, the load torque and the operating voltage for the motor are zero.

The model must be extended in order to switch off the motor realistically. Since the motor is still afterrunning at the instant of switch-off due to the prevailing inertias of the load, armature, shaft and all further driven components, it is possible to work out a solution which reproduces this "afterrunning behaviour" in the best possible manner. As the model calculates the applied load torque by means of the flowing current, information on the instantaneous load is available at the instant of switch-off. This value is retained in a memory cell and at and/or after the instant of switch-off (trigger signal=0) constantly delivered to the model as long as the speed $\omega$ calculated by the model >0. When the simulated speed 0 is reached, the load torque calculated from the load current is processed in the model. As a result of this measure, the temporarily stored load torque assumes the value 0 when the motor is finally at a standstill ($\omega$=0). If a load torque were then still delivered to the model, this would disturb the torque equilibrium at the summing point of the model and the model would calculate incorrect initial values with the motor at a standstill. If the motor is switched on (trigger signal=1), the load torque actually prevailing at the time is immediately reacquired from the load current and the model can start error-free.

However with the introduced model extensions the model is still not completely accurate in the running-down behaviour when the motor is switched off under load. As voltage is no longer applied to the connecting terminals of the motor and the motor terminals are open at the instant of switch-off ($U_q$=0), the afterturning of the motor is only caused by the mechanical components. However the induced voltage is taken into account in the model as long as the motor is still turning. Yet this is no longer of significance when the motor terminals are open. In order to correctly reproduce the running-down behaviour, the induced voltage can therefore be delivered as the supply voltage $U_q$ to the model at the instant of switch-off. This results in $U_q-U_0$=0. 0 is obtained from this equation for the electrical component of the model and only the mechanical component of the model is still active.

The d.c. motor is reproduced as a transfer function of the armature circuit and a representation of the mechanical differential equation. By switching on the motor with the trigger signal, the measured battery voltage and the current actually flowing are firstly switched to the model. As long as the trigger signal is zero, the load torque and the operating voltage are switched to the model. This is important, for otherwise the model would already calculate a speed and misrepresent the overall result.

At the moment of switch-on the voltage passes via a selection switch to the summing point before the armature circuit. At this point the induced motor voltage resulting on account of the speed is subtracted from the operating voltage. The voltage which is thus calculated is the sole driving voltage at the armature circuit. The armature consists essentially of the inductance and the internal resistance of the armature coil. Considered in electrical terms, this forms a low-pass filter with the time constant $T_a=L_a/R_i$. This fact is reproduced here as a transfer function.

While a voltage is applied to the input, the resulting armature current is obtained at the output. This current, multiplied by the motor constant $k_m$, produces the driving motor torque. The load torque and speed-proportional damping must be subtracted from this, so that the actually driving motor torque is obtained, taking account of the incurred losses. This driving torque, multiplied by the moment of inertia of the construction, is then integrated, resulting in the speed in the unit rad/s.

The calculated speed in revolutions per second (U/sec) is obtained through conversion. If this speed is integrated during the on-period of the motor, the sum of all the revolutions within this period of time is obtained. Finally, the travel which is completed is obtained by multiplying this result by the constant $k_m$ (e.g. k=0.02 mm/revolution).

If the motor is switched off, the operating voltage suddenly becomes 0. However the motor continues to turn. In order to simulate this case, the induced armature voltage which was calculated last is delivered as the input voltage to the model at the instant of switch-off. This voltage then tends with time towards 0, whereby the speed also tends towards 0. However it is also important in this respect for the load torque to be reproduced in this case, as the measured current also suddenly becomes 0 when the voltage is switched off. For this purpose the load torque which was established last is retained in a memory cell and delivered as the load torque to the model until the speed calculated from the model is 0. These measures enable the running-down of the motor to be realistically simulated even under fluctuating load conditions.

All the integrators are set to zero each time the motor is switched on again, so that no old values of a last activation misrepresent the result.

Finally, extended by these circumstances, an extended model can be established.

The speed $\omega$ is integrated during the on-period in order to obtain the spindle position. If the result is multiplied by a factor k, which is obtained from the spindle pitch and the transmission ratio, the travel completed is obtained. This travel is equal to the actual spindle position. In the case of the HPB the factor k is, for example, 0.2 mm per motor shaft revolution. The position x (the spindle travel) is therefore calculated as:

$$x = k \cdot k_1 \cdot \int \omega(t) dt$$

with:

$$k_1 = \frac{1}{2\pi}$$

(conversion from rad/sec to revolutions/sec)

k=0.02 (transmission ratio/spindle pitch)

A further advantage of this method lies in the fact that the algorithm can be calculated in 5 msec intervals. The errors occurring due to the slow sampling time in relation to the rapid armature time constant do not have any appreciable effect on the end result.

FIG. 1 shows an equivalent circuit diagram for a D.C. motor 10 with a load 12 having a moment of inertia J connected to the d.c. motor. An operating voltage 24, which is designated by $U_q$, is applied to the D.C. motor 10 at the connections 20, 22. The armature current is designated by $I_q$. In the equivalent circuit diagram the resistance 14 represents the armature resistance $R_i$ of the D.C. motor and the inductance 16 the armature coil inductance $L_q$. The induced voltage 28 which is generated in the motor on account of the rotational movement is designated by $U_o$. Electrical lines 18, 19 in each case connect the electric motor to the connections 20, 22. The magnetic flux (excitation flux) 36 which is required for the rotational movement is generated by a stator coil 30, to which a voltage is applied via the connections 32, 34. The excitation flux 36 is alternatively generated by a permanent magnet.

Figure 2:
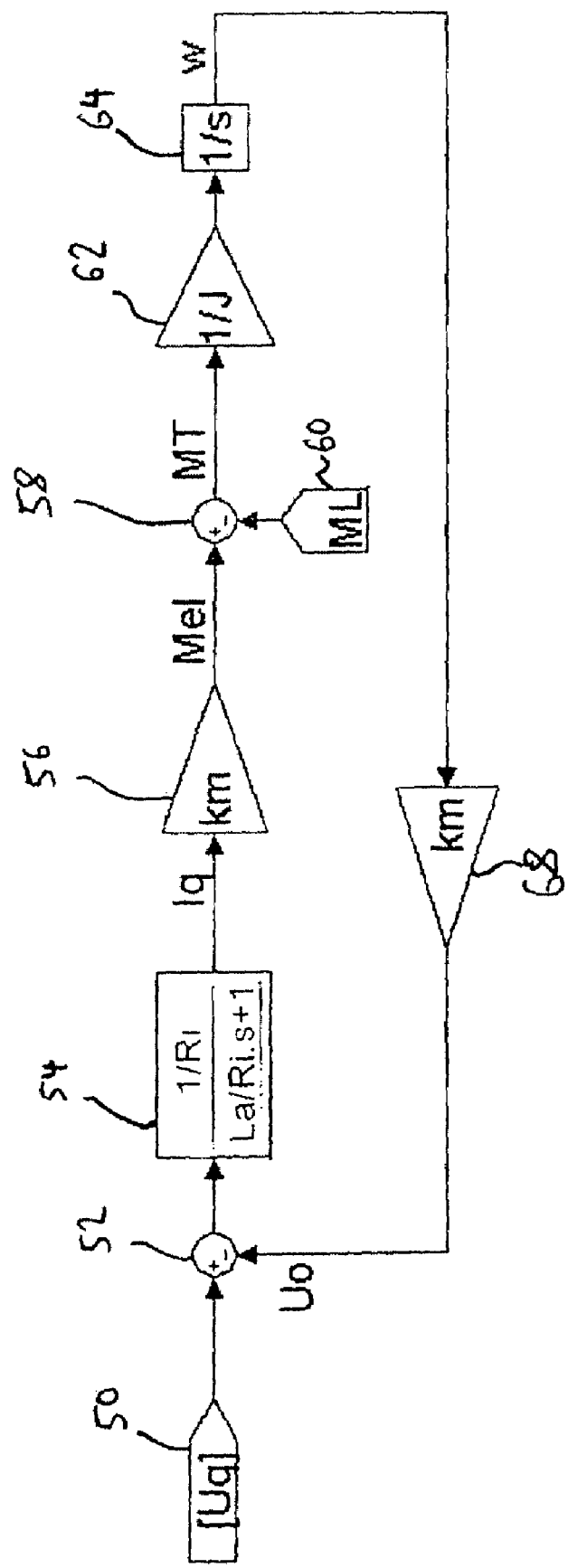
FIG. 2 shows an equivalent circuit diagram in terms of control engineering.

In the equivalent circuit diagram, in terms of control engineering, which is shown in FIG. 2 the operating voltage 50 (again designated by $U_q$ as symbol; corresponds to the reference number 24 in FIG. 1) is applied. The operating voltage $U_q$ and the induced voltage $U_o$ are added in an adder 52. The armature current $I_q$ is calculated by means of the equation 1.3 in the calculation step 54. The generated electrical driving torque $M_{el}$ is calculated from the armature current $I_q$ and the motor constant $k_m$ in the calculation step 56. The acceleration torque $M_T$ which is necessary for acceleration or deceleration is calculated through addition 58 of the driving torque $M_{el}$ to the load torque $M_L$. The angular speed $\omega$ is calculated through division 62 by the moment of inertia J and through subsequent division 64 by the Laplace variable s. The induced voltage $U_o$ is calculated through multiplication 68 by the motor constant $k_m$ and delivered in a feedback path to the adder 52.

Figure 3:
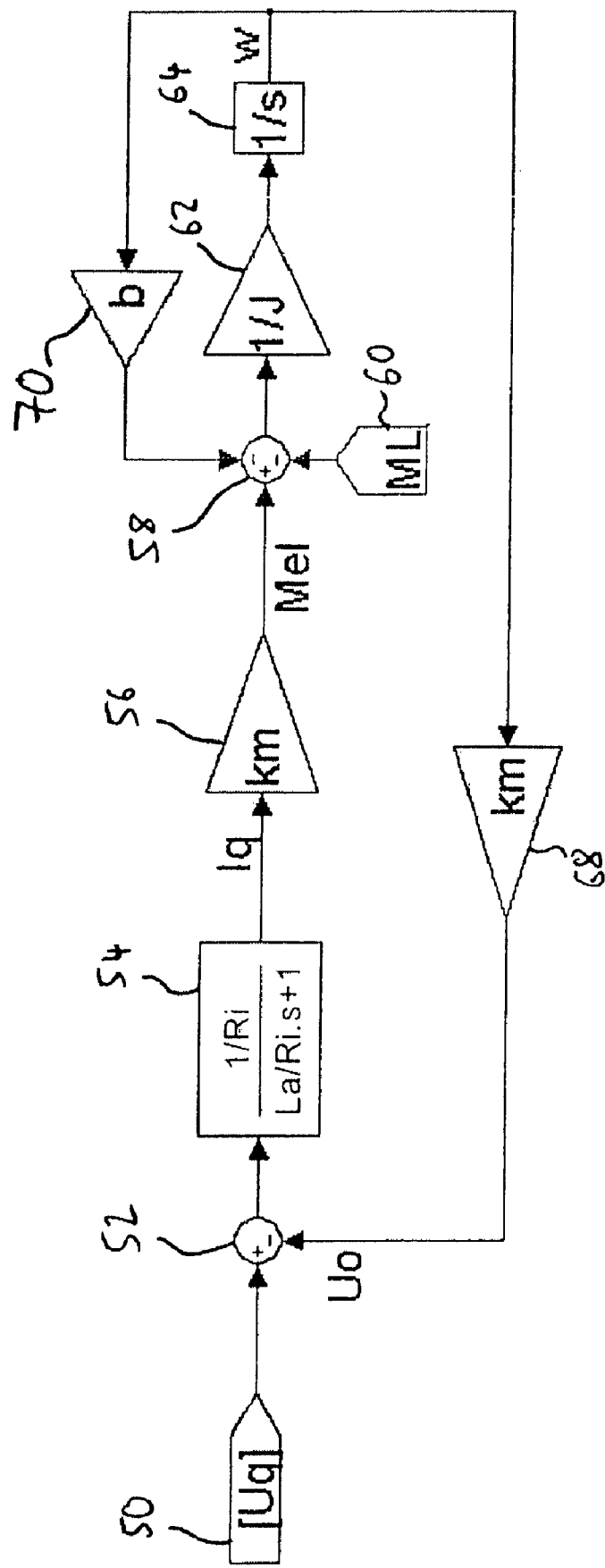
FIG. 3 shows an equivalent circuit diagram in terms of control engineering with speed-proportional damping.

The equivalent circuit diagram from FIG. 3 corresponds substantially to the equivalent circuit diagram from FIG. 2, although additionally has a circuit with speed-proportional damping according to the invention. In an additional step 70, after calculating $\omega$ in the calculation step 64, a damping torque $M_d$ is calculated from the angular speed $\omega$ by multiplying by a damping constant b and delivered to the adder 58. The adder 58 therefore converts the equation 1.10.

Figure 4:
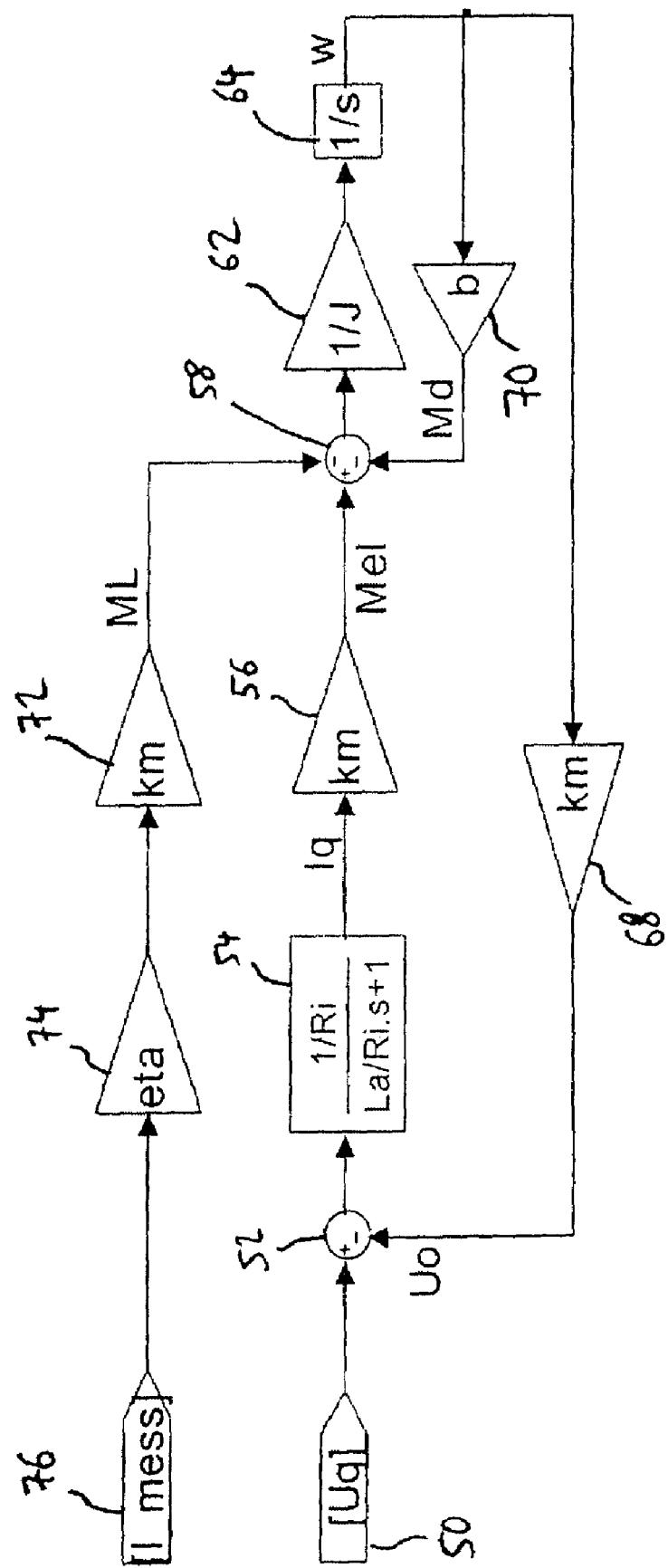
FIG. 4 shows an equivalent circuit diagram in terms of control engineering with the speed-proportional damping and estimation of the load torque.

The equivalent circuit diagram from FIG. 4 corresponds substantially to the equivalent circuit diagram from FIG. 3, although additionally comprises a circuit for calculating the load torque $M_L$. The load torque $M_L$ is calculated through multiplication 74 of the measured motor current 76 by an efficiency factor η (designated in FIG. 4 by eta) and subsequent multiplication 72 by the motor constant $k_m$. This is delivered to the adder 58.

Figure 5:
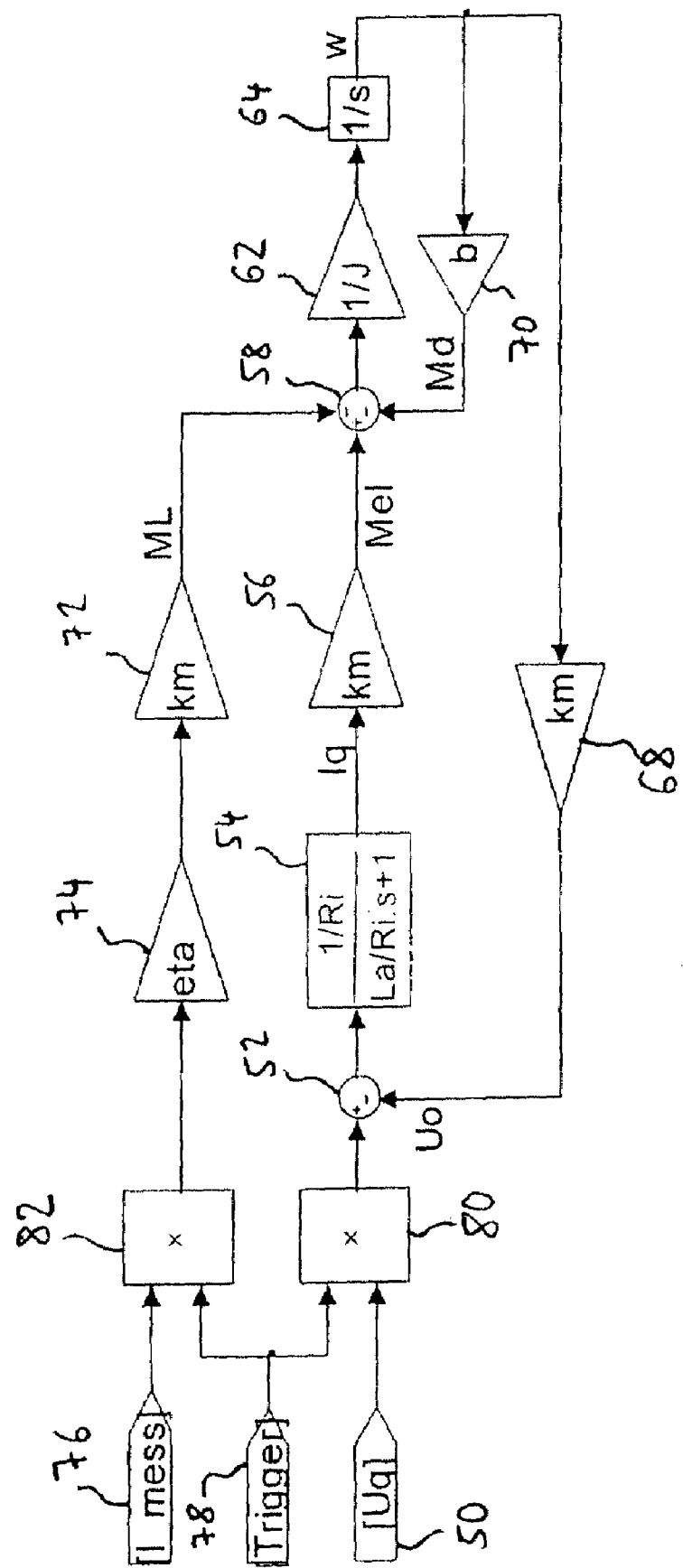
FIG. 5 shows an equivalent circuit diagram in terms of control engineering with the speed-proportional damping, the estimation of the load torque and a trigger signal.

The equivalent circuit diagram from FIG. 5 corresponds substantially to the equivalent circuit diagram from FIG. 4, although additionally comprises a trigger circuit for connecting and disconnecting the control circuit. The switches 80, 82 are activated via the trigger signal 78. If the trigger signal 78 is disconnected, the terminal voltage $U_q$ and the measured motor current are set to zero. If the trigger signal 78 is connected, the terminal voltage $U_q$ and the measured motor current $I_{mess}$ are switched to the model.

Figure 6:
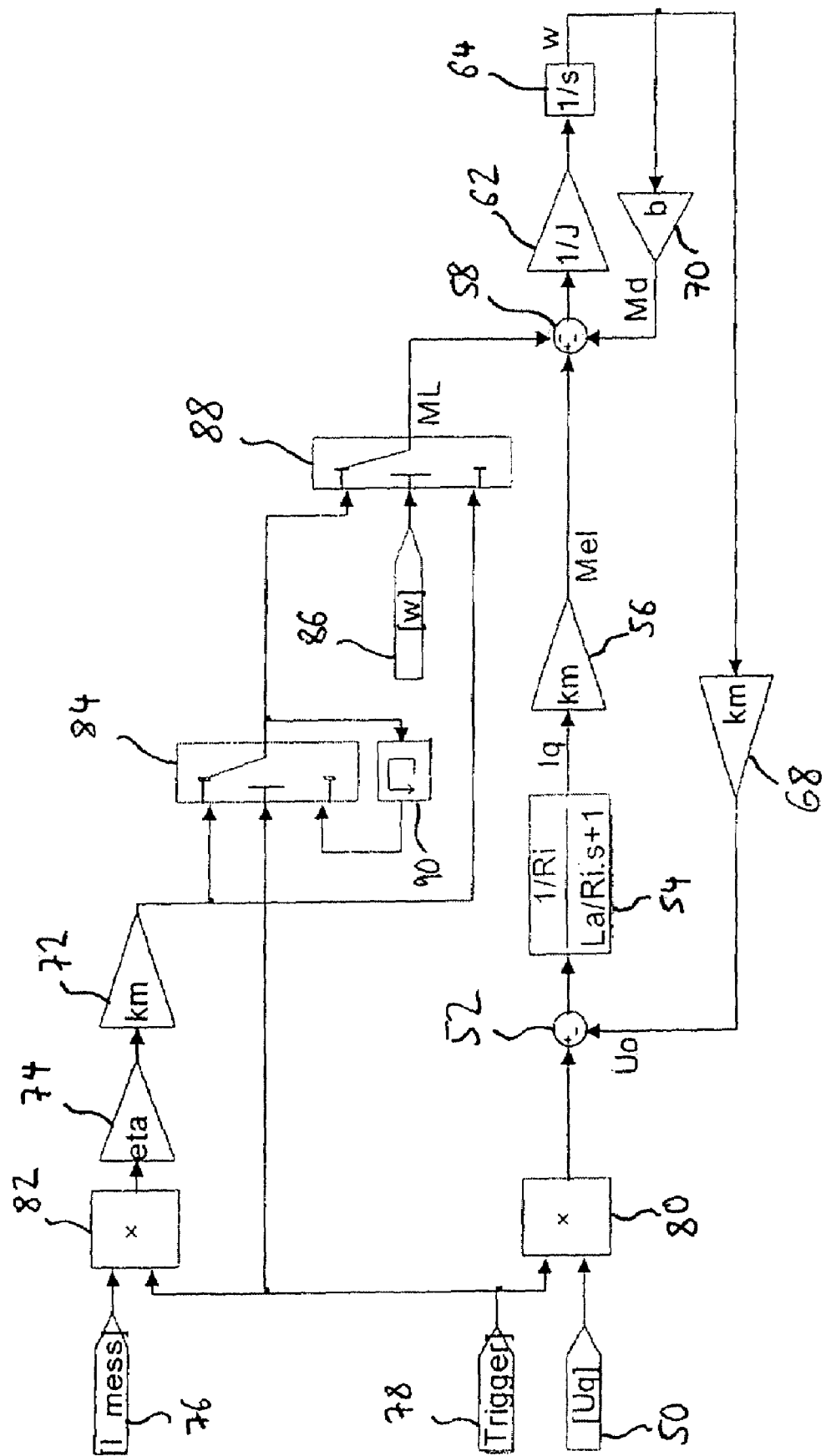
FIG. 6 shows an equivalent circuit diagram in terms of control engineering with the speed-proportional damping, the estimation of the load torque and the trigger signal, wherein the load torque is estimated at the instant when the motor is switched off.

The equivalent circuit diagram which is shown in FIG. 6 differs from the equivalent circuit diagram of FIG. 5 in that a circuit for estimating the load torque at the instant when the motor is switched off is provided between the multiplication step 72 and the adder 58. If the trigger signal 78 is connected, a first switching unit 84 transmits the current value of the load torque $M_L$ to a second switching unit 88. If the trigger signal 78 is disconnected, the instantaneous value of the load torque $M_L$ at the instant when the trigger signal 78 is disconnected is stored in a memory cell 90 and delivered further to the second switching unit 88. The second switching unit 88 transmits the value of the load torque $M_L$ to the adder 58 until the simulated angular speed $\omega$ becomes zero. Thus the second switching unit 88 only transmits the value of the load torque $M_L$ to the adder when the motor is in motion. The trigger signal 78 is connected again when the motor is switched on, so that the actual value of the load torque enters the model via the first switching unit 84 and the second switching unit 88 via the adder 58.

Figure 7:
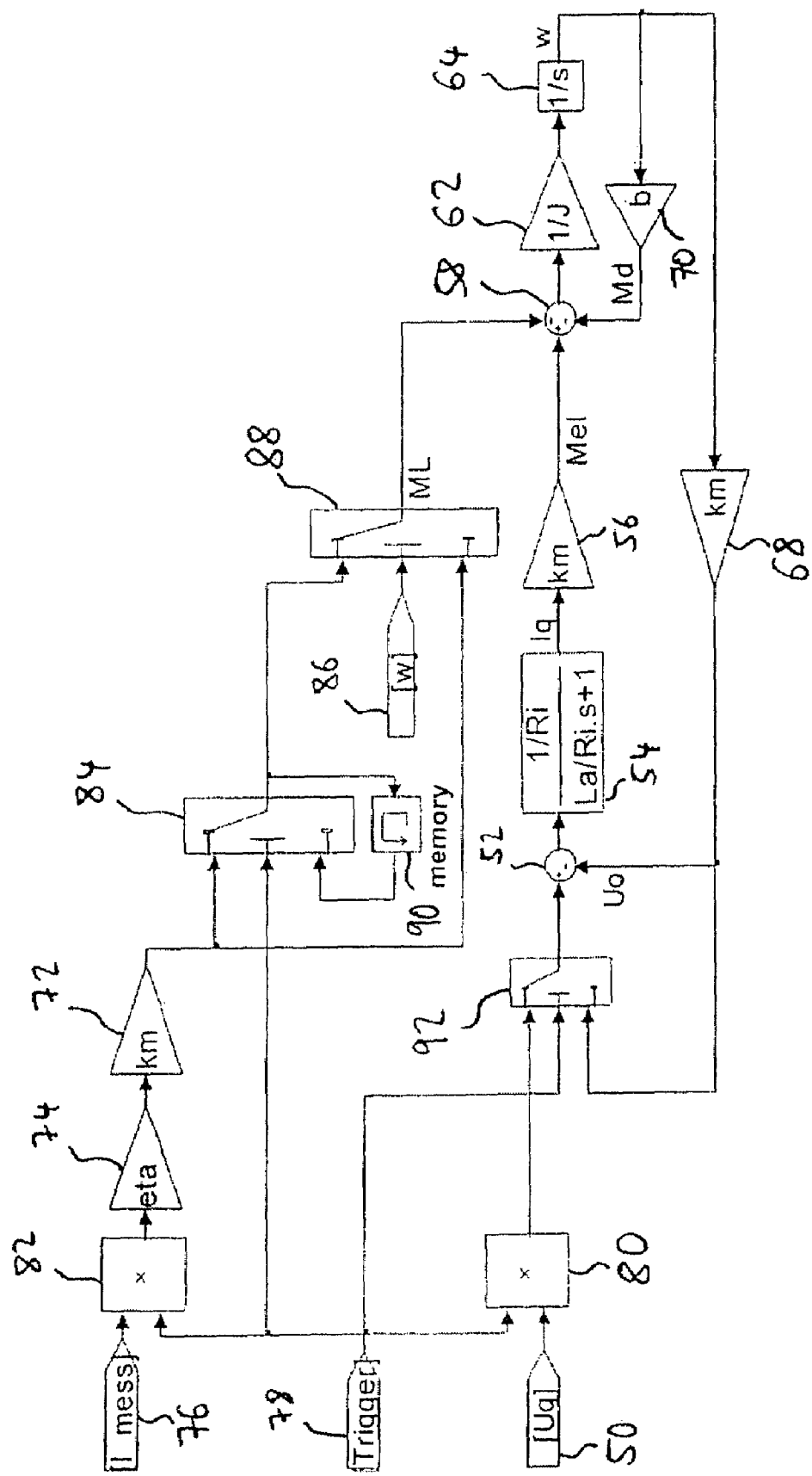
FIG. 7 shows an equivalent circuit diagram in terms of control engineering with the speed-proportional damping, the estimation of the load torque and the trigger signal, wherein the load torque is estimated at the instant when the motor is switched off and account is taken of the voltage conditions at the motor when switching off takes place.

The voltage conditions at the motor upon switching off are additionally taken into account in the equivalent circuit diagram which is shown in FIG. 7. In order to correctly reproduce the running-down behaviour of the motor, the induced voltage is delivered as the supply voltage $U_q$ to the model at the instant of switch-off. If the trigger signal 78 is connected, a third switching unit 92 delivers the terminal voltage $U_q$ to the adder 52. As soon as the trigger signal 78 is disconnected, the third switching unit 92 delivers the induced voltage $U_o$ as the terminal voltage $U_q$ to the adder 52. Therefore $U_q-U_o=0$. Thus only the mechanical component of the model is still active.

Figure 8:
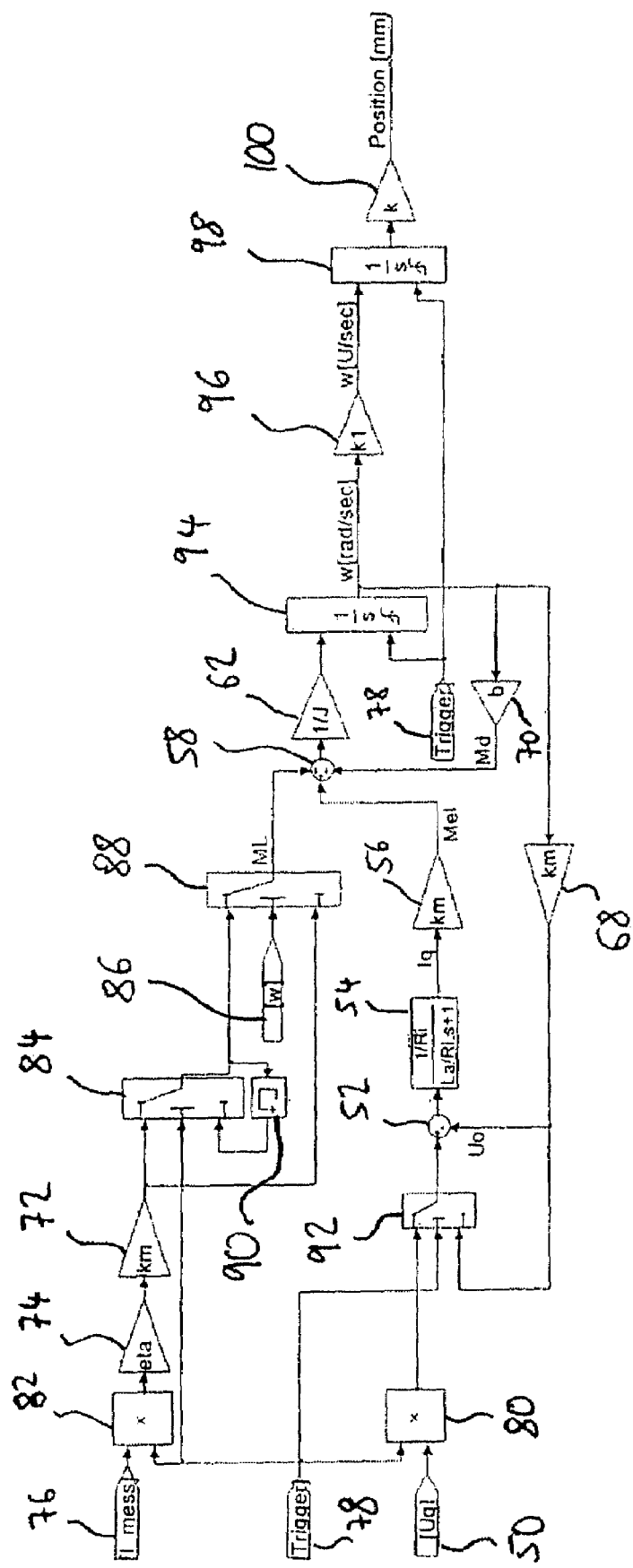
FIG. 8 shows an equivalent circuit diagram in terms of control engineering with the speed-proportional damping, the estimation of the load torque and the trigger signal, wherein the load torque is estimated at the instant when the motor is switched off, account is taken of the voltage conditions at the motor when switching off takes place and an integrator is provided for calculating speed and travel.

The equivalent circuit diagram in FIG. 8 corresponds substantially to the equivalent circuit diagram from FIG. 7, with the angular speed additionally being converted to revolutions per second through multiplication 96 in the block k1. The position of the actuating unit is calculated via the steps 98 and 100. Here, in order to calculate speed and travel, the integrator 98, 100 is reset at the beginning of the calculation, so that old results do not give rise to any miscalculation. In one embodiment resetting takes place with each rising edge of the trigger signal 78. The model advantageously works with short calculation times, preferably in the μs or ms range. In one embodiment the model works with calculation times of 5 ms. The errors occurring due to the slow sampling time in relation to the rapid armature time constant do not have any appreciable effect on the end result.

The expenditure for converting a program code for a microcontroller is low. Porting to a commercial microcontroller, e.g. Siemens C167, is directly possible in integer format.

Figure 9:
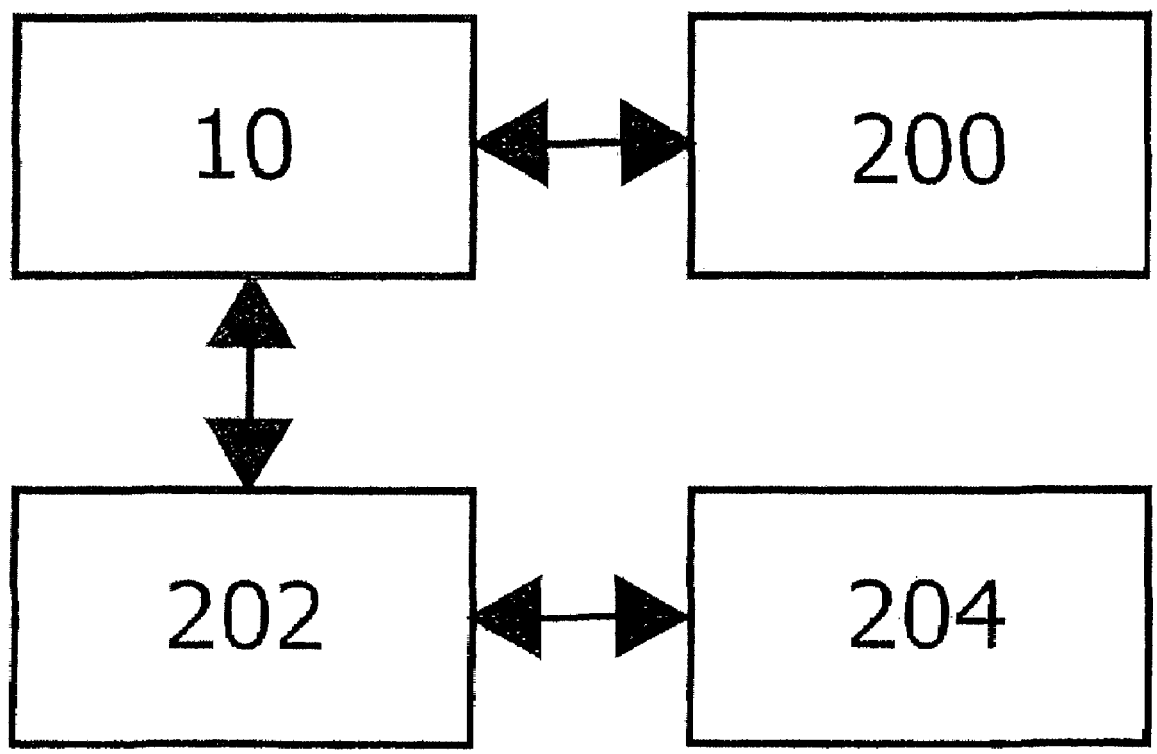
FIG. 9 is a schematic representation of an actuating device with an electric motor, an actuating unit, a processor and a memory unit.

FIG. 9 is a schematic representation of an actuating device according to the invention with an electric motor 10, an actuating unit 200, a memory unit 204 and a processor 202. The electric motor 10 drives the actuating unit 200. The processor 202 executes the method according to the invention for establishing the position of the actuating unit 200 operated by the electric motor 10. The program codes and the measurement data are stored in the memory unit 204. The processor communicates with the electric motor 10. All the data required for establishing the position of the actuating unit 200 operated by the electric motor 10 are fed to the processor 202.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Method for establishing a position of an actuating unit which is operated by an electric motor, comprising the steps:
   determining a motor speed from a motor model that takes account of afterrunnning of the electric motor and includes speed proportional damping of the motor;
   integrating the motor speed over a period of time; and
   establishing the position of the actuating unit by multiplying the result of the integration by a proportionality factor.

2. Method for establishing a position of an actuating unit which is operated by an electric motor, comprising the steps:
   determining a motor speed from a motor model that takes account of both a loading torque acting on the electric motor at the instant of switch-off and afterrunnning of the electric motor;
   integrating the motor speed over a period of time; and
   establishing the position of the actuating unit by multiplying the result of the integration by a proportionality factor.

3. Method according to claim 2, wherein the motor model additionally takes account of damping proportional to the rotational speed.

4. Method according to claim 3, wherein the speed-proportional damping is included in the motor model as a damping torque that is equal to a damping constant multiplied by an angular speed of the electric motor.

5. Method according to claim 4, wherein the damping constant is equal to a no-load friction torque divided by a no-load angular speed of the motor.

6. Method according to claim 5, wherein motor torque is determined from a measured motor current, and further wherein an efficiency factor of an electrical part of the electric motor is taken into account.

7. Method according to claim 6, wherein the method additionally comprises the step of connecting a trigger signal as the first step, and that the step of determining the motor speed is only executed when the trigger signal is connected.

8. Method according to claim 2, wherein the method additionally comprises the step of disconnecting the trigger signal as the last step, the loading torque being determined when the trigger signal is disconnected and delivered to the model as long as the speed calculated by the model is greater than zero and the loading torque assumes the value zero when the calculated speed is zero.

9. Method according to claim 8, wherein an induced voltage is delivered as a supply voltage to the model when the trigger signal is disconnected.

10. Method according to claim 9, wherein an integrator for calculating speed and travel is reset at the beginning of the calculation at each rising edge of the trigger signal.

11. Method according to claim 10, wherein the method additionally comprises the step of converting the speed into revolutions per second.

12. Computer device comprising:
   a computer memory device that stores program codes for executing the following steps for establishing the position of an actuating unit operated by an electric motor:
   determining a motor speed from a motor model that takes account of afterrunnning of the electric motor and includes speed proportional damping of the motor; and
   determining the travel completed by the actuating unit by integrating the motor speed over a period of time and multiplying it by a proportionality factor.

13. Actuating device, comprising:
   an electric motor,
   an actuating unit, which is operated by the electric motor,
   a memory unit,
   a processor, and
   a memory unit that comprises program codes for executing the following steps for establishing the position of the actuating unit operated by the electric motor:
   determining a motor speed from a motor model that takes account of afterrunnning of the electric motor and includes speed proportional damping of the motor, and
   determining a travel completed by the actuating unit by integrating the motor speed over a period of time and multiplying it by a proportionality factor.

14. Actuating device comprising:
   an electric motor,
   an actuating unit, which is operated by the electric motor, said actuating unit being operable to actuate a brake,
   a memory unit,
   a processor, and
   a memory unit that comprises program codes for executing the following steps for establishing the position of the actuating unit operated by the electric motor:
   determining a motor speed from a motor model that takes account of afterrunnning of the electric motor, and determining a travel completed by the actuating unit by integrating the motor speed over a period of time and multiplying it by a proportionality factor.

15. Actuating device comprising:
an electric motor,
an actuating unit, which is operated by the electric motor, said actuating unit being operable to actuate a pump device,
a memory unit,
a processor, and
a memory unit that comprises program codes for executing the following steps for establishing the position of the actuating unit operated by the electric motor:
determining a motor speed from a motor model that takes account of afterrunnning of the electric motor, and
determining a travel completed by the actuating unit by integrating the motor speed over a period of time and multiplying it by a proportionality factor.

16. Actuating device comprising:
an electric motor,
an actuating unit, which is operated by the electric motor, said actuating unit being operable to actuate a transmission,
a memory unit,
a processor, and
a memory unit that comprises program codes for executing the following steps for establishing the position of the actuating unit operated by the electric motor:
determining a motor speed from a motor model that takes account of afterrunnning of the electric motor, and
determining a travel completed by the actuating unit by integrating the motor speed over a period of time and multiplying it by a proportionality factor.

17. Method for establishing a position of an actuating unit which is operated by an electric motor, comprising the steps:
determining a motor speed from a motor model that takes account of afterrunnning of the electric motor by delivering an induced voltage as a supply voltage to the motor model at the instant of switch off;
integrating the motor speed over a period of time; and
establishing the position of the actuating unit by multiplying the result of the integration by a proportionality factor.

18. Actuating device, comprising:
an electric motor,
an actuating unit, which is operated by the electric motor,
a memory unit,
a processor, and
a memory unit that comprises program codes for executing the following steps for establishing the position of the actuating unit operated by the electric motor:
determining a motor speed from a motor model that takes account of afterrunnning of the electric motor by delivering an induced voltage as a supply voltage to the motor model at the instant of switch off, and
determining a travel completed by the actuating unit by integrating the motor speed over a period of time and multiplying it by a proportionality factor.

* * * * *